United States Patent Office 3,039,899
Patented June 19, 1962

3,039,899
TREATING ALUMINUM SURFACES
Fred Keller, New Kensington, and Walter G. Zelley, Lower Burrell, Pa., assignors to Aluminum Company of America, Pittsburgh, Pa., a corporation of Pennsylvania
No Drawing. Filed Feb. 3, 1961, Ser. No. 86,867
9 Claims. (Cl. 148—6.14)

This invention relates to the treatment of aluminum surfaces, and more particularly to an improved method for imparting a protective coating or film to such surfaces. This application is a continuation-in-part of our co-pending application Serial No. 852,932, filed November 16, 1959, now abandoned. As used herein, the word "aluminum" includes pure aluminum, commercial aluminum containing the usual impurities, and aluminum base alloys.

Aluminum surfaces provided with artificial oxide coatings or films may afford high insulating properties, and increased resistance against corrosion, chemical action and the like. Such protective oxide coatings or films may be produced commercially by chemical or electro-chemical methods. For example, an oxide coating may be produced by treating the aluminum surface with an alkaline solution of a carbonate, usually a sodium carbonate-chromate solution. In another common method, an oxide coating may be produced by the anodic oxidation of the aluminum surface whereby the aluminum is made the anode in an electrolytic solution such as sulfuric acid solution or chromic acid solution.

However, oxide coatings formed by these well-known commerical methods are amorphous, relatively porous and absorbent. The anodic coatings generally are sealed as by immersing the aluminum article in boiling water or a boiling nickel acetate solution. Sealing renders the oxide coating nonabsorbent thereby minimizing corrosion or staining of the coating. In order to afford sufficient protection with such coatings, it is essential to produce a relatively thick coating, and sometimes anodic oxide coatings are made as thick as about one mil or more. However, relatively thick, hard coatings being somewhat brittle, have a tendency to craze as, for example, when wound in a small radius or bent at an acute angle, and therefore are somewhat limited in applications.

Another known method for producing an oxide film on an aluminum surface comprises treating the surface with boiling water, usually for one or more hours, and often as much as three hours or even longer. Oxide films formed in this manner are hard, crystalline films of $\alpha$-alumina monohydrate, represented by the formula $Al_2O_3 \cdot H_2O$. Relatively thin conversion films of this nature exhibit high resistance to corrosion or chemical attack and high electrical insulating properties. For most applications, the thickness of the film should not be less than about 0.01 mil. However, use of $\alpha$-alumina monohydrate surface films has attained only very limited commercial success because of the prolonged treatment required for forming a film of sufficient thickness.

It is, therefore, the primary object of this invention to provide an improved method of imparting a crystalline protective film to an aluminum surface in a relatively short period of time by employing a chemical method.

It is another object of the invention to form an oxide film comprising $\alpha$-alumina monohydrate on an aluminum surface, which film is characterized by high insulating properties and excellent resistance to corrosion and chemical attack.

In accordance with the present invention, an oxide film may be produced on an aluminum surface by immersing the same in a hot solution consisting essentially of water and at least one of certain alkaline earth compounds hereinafter identified, which render the solution alkaline within a pH range of approximately 8.5 to 10.5. The alkaline earth compound (or compounds) are selected from the group consisting of alkaline earth oxides, hydroxides and carbonates which are only slightly soluble in water, i.e. calcium oxide (which forms calcium hydroxide in aqueous solution), calcium hydroxide, calcium carbonate, strontium carbonate and barium carbonate. A hard, dense, crystalline oxide film of $\alpha$-alumina monohydrate may be so imparted to the aluminum surface by a single immersion, for at least about 3 minutes, in a hot or boiling solution of one or more of the identified alkaline earth compounds.

It has been found that the solution employed in accordance with our procedure for producing the film should have a pH of approximately 8.5 to 10.5. Generally, treating aluminum surfaces in solutions having a pH lower than about 8.5 proceeds too slowly to be economically feasible, particularly for continuous coating operations. On the other hand, when the alkalinity exceeds a pH of about 10.5, an etching action results, dissolving away both aluminum metal and any oxide film that may form.

The commonly available alkaline earth compounds of the group identified, which are only slightly soluble in water at a temperature of about 175° F. or above, have been found suitable for the practice of our invention. The solubility of each of these compounds is less than about 1 gram per liter. It has been observed that such slightly soluble compounds render the aqueous solutions alkaline within the pH range found essential for the practice of our invention, thereby obviating the need for pH adjustment. The substantially more soluble strontium or barium oxides or hydroxides yield solutions having a pH above about 10.5 unless maintained at extremely low concentrations (which is impracticable, particularly when operating on a large scale).

The solution preferably contains an excess of undissolved alkaline earth compound of the group identified. This maintains the hot solution in a saturated condition at the desired pH. As operations continue, undissolved compound passes into solution replenishing the solute consumed in the treatment. As a result, the bath is self-buffering at the desired alkaline pH. For example, calcium carbonate has a solubility of about 0.02 gram per liter in hot water. A typical saturated solution of calcium carbonate, at 175° F. or above, has a pH of about 9 or slightly higher, and it may be readily maintained by simply providing an excess of undissolved calcium carbonate. Thus, employing a solution of only a single compound, in low concentrations, for short periods, results in substantial economic savings.

According to our invention, the desired oxide film can best be obtained by treating the aluminum surface in a bath as herein described, which is maintained at a temperature above about 175° F., and preferably above about 190° F. Employing bath temperatures lower than about 175° F. extends considerably the time required for producing the oxide film (or produces undesirably thin films) and, therefore, is not practical.

Immersing an aluminum article in the aqueous solution of a slightly soluble alkaline earth compound from the group identified, for about 3 to 15 minutes, and preferably 5 to 12 minutes, will produce the desired crystalline oxide film, when operating within the above-described temperature ranges. More prolonged immersions may increase slightly the thickness of oxide film produced, but this increase generally is not sufficient to warrant the longer immersions. On the other hand, immersions for less than 3 minutes generally are not sufficient to produce an oxide surface coating of desired thickness.

To illustrate the advantages of our invention, an aluminum panel was immersed for 10 minutes in a boiling aqueous solution of calcium carbonate containing an excess of undissolved calcium carbonate. The pH of the solution was about 9. An α-alumina monohydrate film formed on the surfaces of the panel was found to have a thickness of slightly over 0.01 mil. To form an oxide film of comparable thickness on a substantially identical aluminum panel by immersion in boiling distilled water required treatment for over one hour.

Aluminum panels treated in accordance with our invention were tested for the D.C. voltage breakdown of the oxide coating to determine the insulating properties of the coating. The voltage breakdown tester was that developed by the National Bureau of Standards and published in "The Review of Scientific Instruments," vol. 24, No. 6, p. 458 (June 1953), employing a one ounce copper probe. In all cases a saturated solution of the solute in water was used, and the films of α-alumina monohydrate formed had thicknesses over about 0.01 mil. The results are set forth in the following table:

| Solute | Time (Minutes) | Temperature | pH | Average Voltage Breakdown |
|---|---|---|---|---|
| $Ca(OH)_2$ | 10 | Boiling | 10.5 | 75 |
| $CaCO_3$ | 10 | Boiling | 8.8 | 75 |
| $SrCO_3$ | 10 | 175° F. | 8.5 | 40 |
| $BaCO_3$ | 10 | 175° F. | 8.9 | 55 |
| $BaCO_3$ | 5 | Boiling | 8.9 | 35 |

Results obtained with two other solutions not of the type used in the practice of our invention are also included in the following table for comparison:

| Solutes | Time (minutes) | Temperature | Oxide Film | Average Breakdown Voltage |
|---|---|---|---|---|
| 2% NaOH, 2.9% $NH_3$, 6.5% $Na_2Si_4O_9$ | 13 | 160 | amorphous | 7 |
| 2% $Ca(OH)_2$, 5N $Na_2CO_3$ | 10 | 160 | etching only | 0 |

The α-alumina monohydrate film formed on an aluminum surface in accordance with our invention is a hard, crystalline film characterized by high insulating properties and high resistance to corrosion and chemical action. As an example, aluminum strip provided with the α-alumina monohydrate film is useful in electrical condensers or foil wound coils. Aluminum strip having this protective film is also useful, for example, as weather stripping for storm windows or doors.

Having described our invention, we claim:

1. The method of producing an oxide film on an aluminum surface, comprising immersing an aluminum surface, for at least about 3 minutes, in a solution maintained at a temperature above about 175° F. and consisting essentially of water and at least one compound selected from the group consisting of calcium oxide, calcium hydroxide, calcium carbonate, strontium carbonate and barium carbonate, said compound rendering the solution alkaline within a pH range of approximately 8.5 to 10.5, whereby a crystalline film of α-alumina monohydrate is formed on the aluminum surface.

2. The method of claim 1 wherein the solution contains an excess of undissolved compound from the group identified, which maintains the solution in a saturated condition.

3. The method of claim 1 wherein the solution is maintained at a temperature above about 190° F.

4. The method of claim 1 wherein the aluminum surface is immersed for about 3 to 15 minutes.

5. The method of claim 1 wherein the compound employed is calcium carbonate.

6. The method of claim 1 wherein the compound employed is calcium hydroxide.

7. The method of claim 1 wherein the compound employed is calcium oxide.

8. The method of claim 1 wherein the compound employed is strontium carbonate.

9. The method of claim 1 wherein the compound is barium carbonate.

References Cited in the file of this patent

UNITED STATES PATENTS

| | | |
|---|---|---|
| 1,846,844 | Clark | Feb. 23, 1932 |
| 2,129,840 | Hessenbruch | Sept. 13, 1938 |
| 2,250,472 | De Long | July 29, 1941 |
| 2,859,148 | Altenpohl | Nov. 4, 1958 |